(12) United States Patent
Woodell et al.

(10) Patent No.: US 7,557,735 B1
(45) Date of Patent: Jul. 7, 2009

(54) PREDICTIVE AND REACTIVE WINDSHEAR DETECTION SYSTEM AND METHOD

(75) Inventors: Daniel L. Woodell, Cedar Rapids, IA (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 315 days.

(21) Appl. No.: 11/515,641

(22) Filed: Sep. 5, 2006

(51) Int. Cl.
*G08B 23/00* (2006.01)

(52) U.S. Cl. .................. 340/968; 340/649; 356/450

(58) Field of Classification Search ............... 340/968, 340/949, 951, 963, 969, 979, 649, 961; 701/4, 701/14; 356/5.01, 28.5, 450; 244/181, 182
See application file for complete search history.

(56) References Cited

U.S. PATENT DOCUMENTS

| | | | |
|---|---|---|---|
| 3,955,071 A | 5/1976 | Lambregts | |
| 4,250,746 A | 2/1981 | Vassie et al. | |
| 4,373,184 A | 2/1983 | Lambregts | |
| 4,589,070 A * | 5/1986 | Kyrazis | 701/14 |
| 4,593,285 A | 6/1986 | Miller et al. | |
| 4,728,951 A | 3/1988 | Johnson et al. | |
| 4,797,674 A | 1/1989 | Zweifel et al. | |
| 4,812,844 A | 3/1989 | Kallstrom | |
| 4,841,448 A | 6/1989 | Ford | |
| 4,853,861 A | 8/1989 | Ford et al. | |
| 4,857,922 A | 8/1989 | Miller et al. | |
| 4,863,120 A | 9/1989 | Zweifel et al. | |
| 4,893,245 A | 1/1990 | Zweifel | |
| 4,901,564 A | 2/1990 | Williams et al. | |
| 4,905,000 A | 2/1990 | Bateman | |
| 4,937,447 A | 6/1990 | Barrett | |
| 4,947,165 A | 8/1990 | Zweifel | |
| 4,965,573 A | 10/1990 | Gallagher et al. | |
| 4,996,473 A | 2/1991 | Markson et al. | |
| 5,036,480 A | 7/1991 | Zweifel et al. | |
| 5,059,964 A | 10/1991 | Bateman | |
| 5,119,091 A | 6/1992 | Zweifel | |
| 5,175,551 A | 12/1992 | Rubin | |
| 5,311,183 A | 5/1994 | Mathews et al. | |
| 5,361,065 A | 11/1994 | Johnson et al. | |
| 5,384,572 A | 1/1995 | Michaels et al. | |
| 5,394,238 A | 2/1995 | Mocker et al. | |
| 5,539,409 A | 7/1996 | Mathews et al. | |
| 5,615,118 A * | 3/1997 | Frank | 701/4 |
| 5,724,125 A * | 3/1998 | Ames | 356/28.5 |
| 6,188,330 B1 | 2/2001 | Glover | |
| 6,856,396 B2 * | 2/2005 | McGuire | 356/450 |
| 7,095,488 B2 * | 8/2006 | Jamieson et al. | 356/5.01 |

* cited by examiner

*Primary Examiner*—Van T. Trieu
(74) *Attorney, Agent, or Firm*—Daniel M. Barbieri

(57) ABSTRACT

A method of detecting a windshear hazard on aircraft is disclosed. The method includes determining a first wind velocity of the aircraft at the location of the aircraft using a wind velocity detector. The method also includes determining a second wind velocity at a distance ahead of the aircraft using a forward-looking wind velocity detection system onboard the aircraft. Further, the method comprises determining the wind velocity gradient over the distance and determining whether windshear hazard exists for the aircraft.

22 Claims, 6 Drawing Sheets

PREDICTIVE AND REACTIVE WINDSHEAR DETECTION SYSTEM AND METHOD

BACKGROUND

Windshear is a generic term referring to any rapidly changing wind currents. A type of weather phenomenon called "microbursts" can produce extremely strong windshear, posing great danger to aircraft. These are local, short-lived downdrafts that radiate outward as they rush toward the ground. As a downdraft spreads down and outward from a cloud, it creates an increasing headwind over the wings of an oncoming aircraft. This headwind causes a sudden leap in airspeed, and the plane lifts. If the pilots are unaware that this speed increase is caused by windshear, they are likely to react by reducing engine power. However, as the plane passes through the shear, the wind quickly becomes a downdraft and then a tailwind. This reduces the speed of air over the wings, and the extra lift and speed vanish. Because the plane is now flying on reduced power, it is vulnerable to sudden loss of airspeed and altitude. The pilots may be able to escape the microburst by adding power to the engines, but if the shear is strong enough, they may be forced to crash.

Conventionally predictive windshear systems are not available for small antenna weather radar installations used by most business and regional systems (BRS) aircraft. Reactive systems are generally available on BRS aircraft but only warn 5-10 seconds after entering a windshear event. Because every second of warning represents approximately 40 feet of altitude loss prevented, moving the windshear system to be accurate at the advance edge may represent the removal of 200 to 400 feet of altitude loss. Weather radar systems may be used to detect certain windshear signatures, however business and regional systems aircraft may have small antennas with broad beam width, low-power, and with fairly little range.

Accordingly, there is a need for a hybrid windshear system which combines data from conventional predictive and reactive windshear systems or from equipment that may be related to predictive and reactive windshear systems and may be available on a BRS aircraft in order to provide the alerting and warning of windshear events.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a method of detecting a windshear hazard on an aircraft. The method includes determining a first wind velocity of the aircraft at the location of the aircraft using a wind velocity detector. The method also includes determining a second wind velocity at a distance ahead of the aircraft using a forward-looking wind velocity detection system on board the aircraft. Further, the method comprises determining the wind velocity gradient over the distance and determining whether a windshear hazard exists for the aircraft.

Another exemplary embodiment relates to a system for determining the presence of a windshear hazard. The system includes a local wind velocity detector system and a look-ahead wind velocity detector system. The system also includes a processor configured with software to process information from the reactive windshear system and the predictive windshear system and determine whether a windshear hazard exists.

Further, another exemplary embodiment relates to a method for altering the flight path of an aircraft. The method comprises determining the presence of windshear in near proximity to the aircraft by using a hybrid windshear detection system. The method also comprises determining automatically an alternative flight path for the aircraft. Further, the method comprises providing a suggestion of the alternative flight path for the aircraft to the flight crew.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
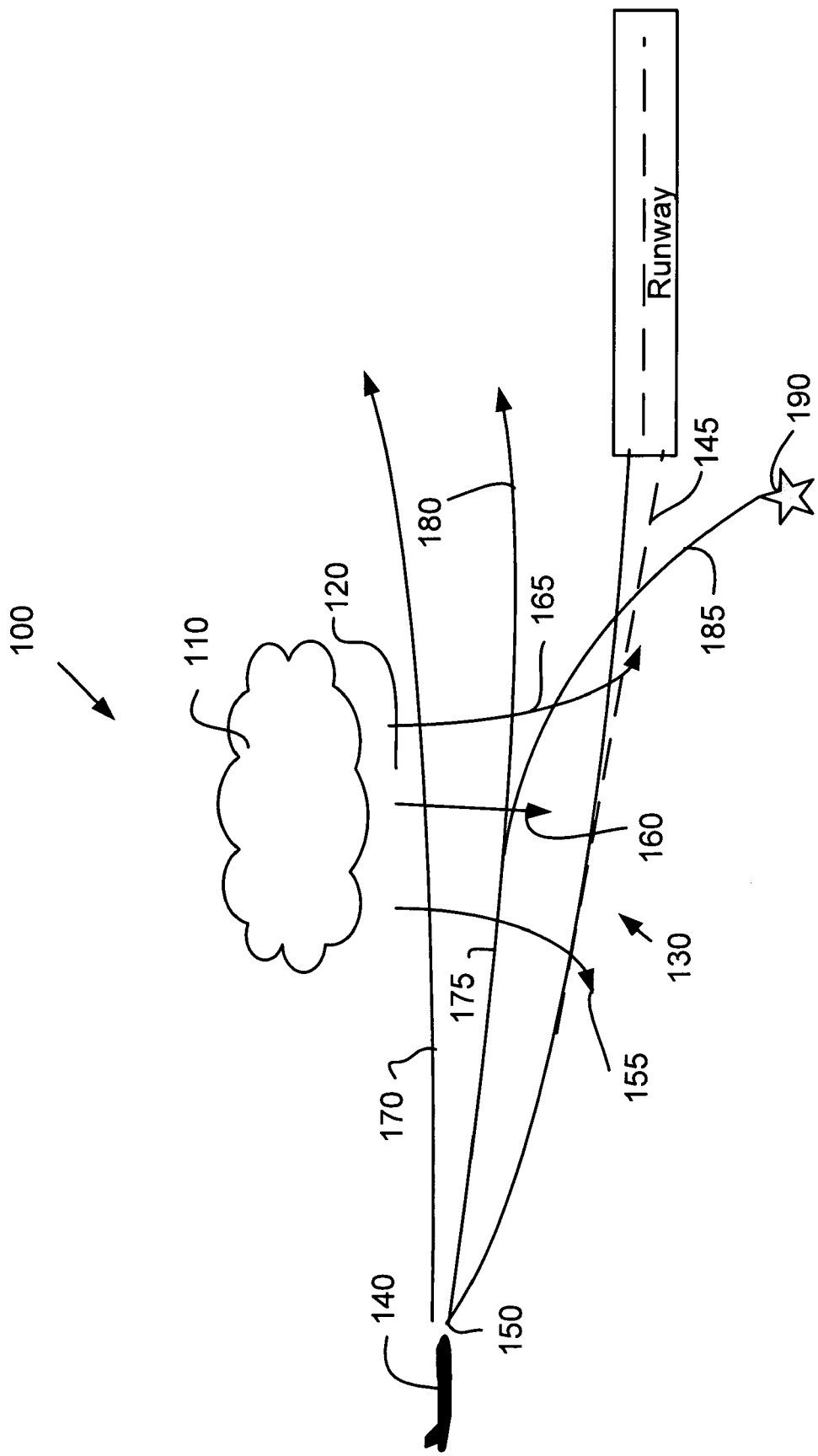
FIG. 1 is an exemplary diagram of an airplane encountering a windshear event during landing.

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Windshear poses the greatest danger to aircraft during takeoff and landing, when the plane is close to the ground and has little time or room to maneuver. During landing, the pilot has already reduced engine power and may not have time to increase speed enough to escape the downdraft. During takeoff, an aircraft is near stall speed and thus is very vulnerable to windshear.

Both reactive and predictive windshear systems use a NASA defined hazard factor called the "F-factor." It may be defined as follows;

$$F = \frac{Wh}{G} - \frac{Vd}{As}$$

Where Wh is the rate of airspeed loss in kts per seconds, g is gravity, Vd is the vertical down draft rate, and As is the aircraft airspeed. The Wh/g term represents the rate of change in the horizontal winds. The Vd/As represents a measure of down draft strength. A way to think of F-factor is the rate of removal of energy from the aircraft. If an aircraft has the thrust to add to its energy, say at the rate of 0.2 G, a windshear event with an F-factor less than 0.2 will not cause the aircraft to lose altitude. If the aircraft has less powerful engines, it may only be able to accelerate at some lesser value, for example, 0.085 G. So a 0.2 G F-factor windshear would remove energy at the rate of 0.2-0.085=0.115 G. That energy loss could be seen in either a decrease in aircraft speed or its altitude. The FAA has set a threshold of F=0.103 G averaged over 1 km of range. Estimated F-factors greater than this value should result in a warning to the aircrew.

There are two kinds of systems which are used to sense F-factors; reactive and predictive systems. The reactive system uses the aircraft's in-situ instrumentation to estimate Wh, Vd, and As. Without any prediction capability, this system must wait until enough energy has been removed from the aircraft before it is capable of issuing an alarm. FAA specification's allow this type of system to produce a warning as late as 5 to 10 seconds after energy begins being removed from the aircraft at the F=0.103 G rate.

The second system type is a predictive system. Predictive systems measure the airflow in front of the aircraft. Radar is one method of making those measurements. But radar only measures the radial velocity along the direction of the radar beam. So when radar is used, the vertical down draft estimate must be driven from a model of the down-flow, not an actual measurement. At the current time, predictive systems are required to issue a warning at least 10 seconds before the beginning of an event. So at the specification limits of the reactive and predictive systems, predictive systems produce at least an additional 15 to 20 seconds of warning. This represents 600 to 800 feet less altitude loss for a typical aircraft at the F-factor value of 0.103.

While windshear prediction has advantages, prediction by radar requires a sufficient Doppler radar return to estimate velocities. Airborne weather radars bounce radio waves off hydrometeors in the atmosphere. For any required range, enough hydrometeors must be available to produce a signal to estimate Doppler velocities. As the amount of hydrometeors sampled drops, the signal can become small enough to be unusable. The signal may also be too small to be useful as the radar's capability drops. Less transmitter power, less sensitive receivers, or smaller/lower gain antennas all cause the radar returns to drop in power.

The current air-transport market is currently served with radars with sufficient performance to make F-factor estimates over the range of interest. What is desired is to make F-factor estimates with the types of radars and antennas used in smaller aircraft such as those used in business and regional service. These radars have lower performance because both of price pressures on smaller aircraft and the smaller antennas that must be used in these smaller aircraft.

As radar performance decreases, the range at which a given environment can be sampled also drops. So decreasing the range sampled and thus the warning time issued can allow lower performance radars to be used. But in addition to the challenge of producing estimates at lower signal to noise levels driven by lower performance radars, the issue of small antenna size is more than just a signal to noise problem. Radars used for windshear detection are limited by both signal to noise and by signal to clutter constraints. Not only must the weather signal be detectable and large enough to estimate Doppler velocity signatures, the weather must also be able to be isolated from radar returns from ground clutter. Ground returns may be 60 to 90 dB larger than minimum return levels from weather. Accordingly, there may be two problems to contend with; signal to noise and signal to clutter.

As the sample range over which the radar estimates F-factor begins at lower and lower ranges, a limit is met. The radar transmitter pulse must be completed and receiver recovered from effects of the transmitter pulse before the small signal weather returns may be processed and Doppler frequencies estimated. Accordingly, radar returns from near the aircraft are ineffective at providing estimates of wind velocity, though it would be desirable to move the sample region back all the way to the aircraft. For Modern air transport category radars, moving the sample region back to the aircraft nose would provide up to one-half a nautical mile of additional detection range. For limited performance radars having a minimum range at the aircraft's nose would allow the system to still produce F-factor alarms at the windshear event boundary, some 5 to 10 seconds before a reactive system would alarm. Such a system would have advantages over a reactive system acting alone. To accomplish this without using radar returns near the aircraft, the in-situ instrumentation that the reactive system uses to produce estimates at the current aircraft location may be used. Since F-factor is defined to be estimated over a 1 km range, starting at the aircraft's nose using "reactive sampling" and appending radar estimates at longer ranges allow us to estimate F-factor right at the current location without the latency of the pure reactive system.

Decreasing the range requirements for windshear detection by utilizing reactive sampling produces other advantages. Not only is signal to noise improved since samples are taken at lower ranges, but also clutter returns begin to fall out of the radar beam at such short ranges. The advantage of using the reactive like samples also helps signal to noise issues compared to radar estimates alone. Consider for example, location of hydrometeors in a microburst where a vertical jet of air dropping and splashing out over the ground. The hydrometeors are always dropping relative to the air mass they are carried in. So even when an aircraft is outside the radar reflective portion of the event, the aircraft may be inside the portion of the event where airflow is changing and the aircraft is being effected. A predictive system acting alone would have to penetrate far enough to be able to sample returns from hydrometeors. A reactive sampling system or hybrid system which which takes wind velocity measurements at the aircraft, is not limited to only determining velocites estimates where sufficient hydrometeors are available to produce good signal to noise ratios.

Accordingly, a hybrid velocity sampling system is described. The hybrid system includes one velocity estimate that is taken from the current airflow at the aircraft while other airflow estimates are taken at short ranges by the weather radar system. Such a system may have but is not limited to one or more of the following advantages;

1. Better warning time compared to reactive (in an exemplary embodiment 5 to 10 seconds better).
2. Much lower radar gain required than a classic windshear weather radar.
3. Less ground clutter differentiation required than the classic weather radar since weather is sampled at ranges when ground returns are falling out of the radar beam.
4. Able to produce better F-factor estimates at the edge of radar reflectivity fields that exist on the edges of many microburst events.

Referring now to FIG. 1, a windshear event 100 is depicted. A storm system 110 may create rain 120 accompanied by microbursts 130. Such microbursts present a danger to aircraft primarily during takeoff and landing. Aircraft 140 may be proceeding, for example, along a glide slope 145. At a point 150 aircraft 140 enters a windshear region. In such a windshear region, aircraft 140 first encounters a headwind 155 followed by a downdraft 160 and then followed by a tailwind 165. If the pilot of aircraft 140 is alerted to the dangerous windshear conditions in a timely manner, the pilot of aircraft 140 will make a windshear avoidance maneuver along path 170. However, if the windshear is not detected in a timely manner, aircraft 140 may attempt to recover along a path 175. If the aircraft evasive maneuvers are accomplished in time, aircraft 140 may fly through the windshear zone along a path 180. However, if the aircraft fails to avoid the dangerous windshear, the aircraft may end up following a path 185 which results in a crash at a crash site 190. Accordingly, it is very important that such windshear systems provide the pilot with enough time to make a decision to attempt to avoid the windshear hazards.

Figure 2:
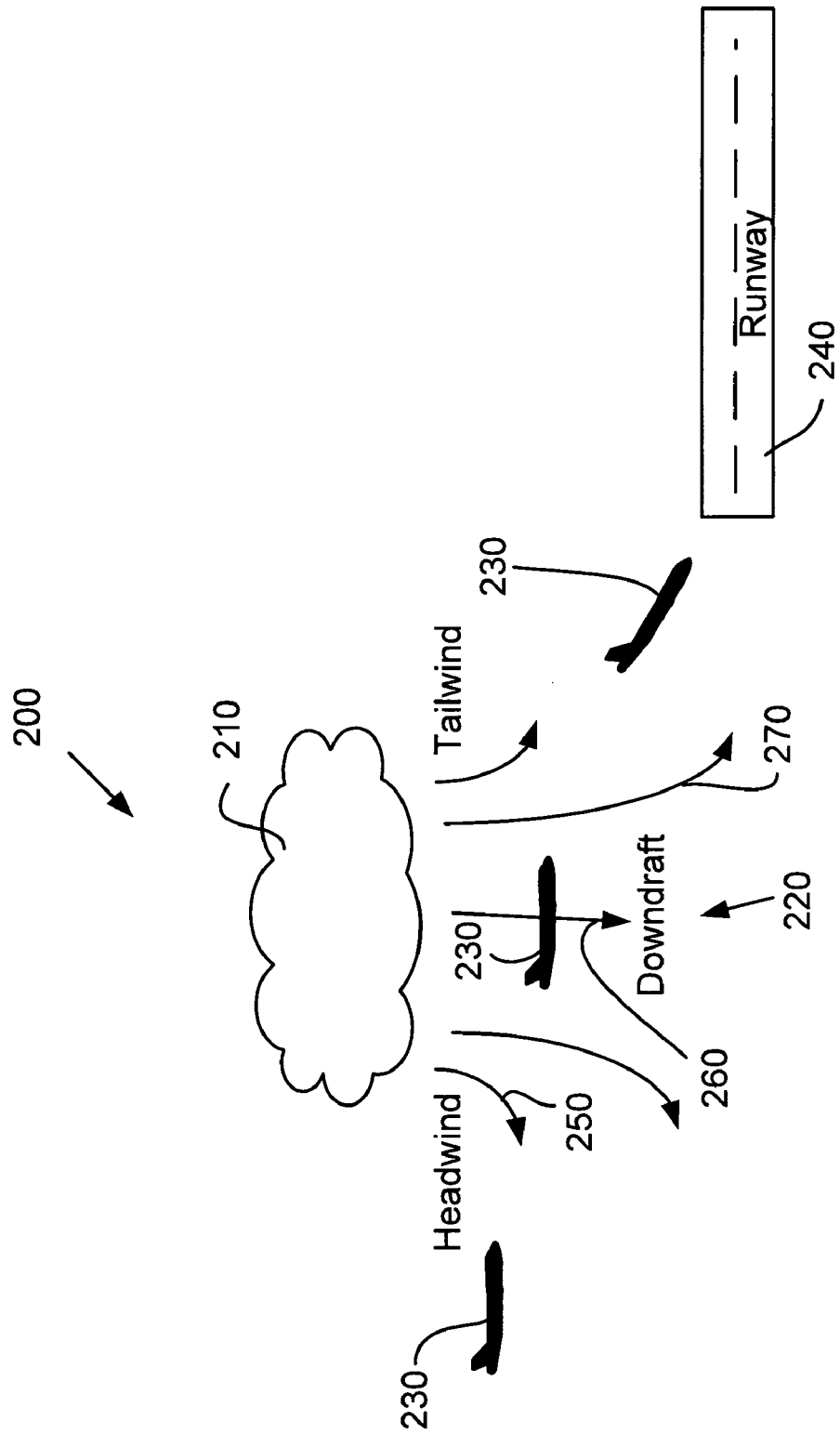
FIG. 2 is another representation of an aircraft encountering a windshear event during landing.

Referring now to FIG. 2, a windshear event 200 is depicted. Windshear event 200 includes a storm system 210. Storm system 210 creates a microburst 220. Microburst 220 is encountered by aircraft 230 as it proceeds in a landing pattern attempting to reach runway 240. As aircraft 230 approaches the windshear region, the aircraft 230 first encounters a headwind 250. As aircraft 230 proceeds along its glide slope in attempt to reach runway 240 aircraft 230 then encounters downdrafts 260. As aircraft 230 nears the end of the windshear region, aircraft 230 encounters tailwinds 270. The plane 230 entering the microburst encounters headwinds, increased air speed, and therefore, to maintain air speed and rate of descent the pilot typically reduces power. The plane flies through the headwind and encounters downdrafts 260 followed by tailwind 270. Downdraft 260 and tailwind 270 cause rapidly reducing airspeed and climb potential. Because of the earlier cut in power, the plane may be caused to crash.

Microburst windshear often occurs during thunderstorms. But it can also arise in the absence of rain near the ground. Some sensor systems may work better in rain, while others may perform more successfully during dry conditions. Typically, pilots need 10 to 40 seconds of warning to avoid windshear. Fewer than 10 seconds is usually not enough time to react, while more than 40 seconds is too long, atmospheric conditions can change in that amount of time. Microwave radar is conventionally applied for giving advance warning of windshear in a predictive windshear system.

Microwave radar sends a microwave radar signal ahead of the aircraft to seek raindrops and other moisture particles. The returning signal represents the motion of those raindrops and moisture particles, and this is translated into wind speed. Microwave radar works better than other systems in rain but less well in dry conditions. Because it points toward the ground as the plane lands, it picks up interfering ground returns, or "clutter." However, efforts are progressing to eliminate this interference. Such a radar transmitter is available from Rockwell Collins, Inc. of Cedar Rapids, Iowa.

Figure 3:
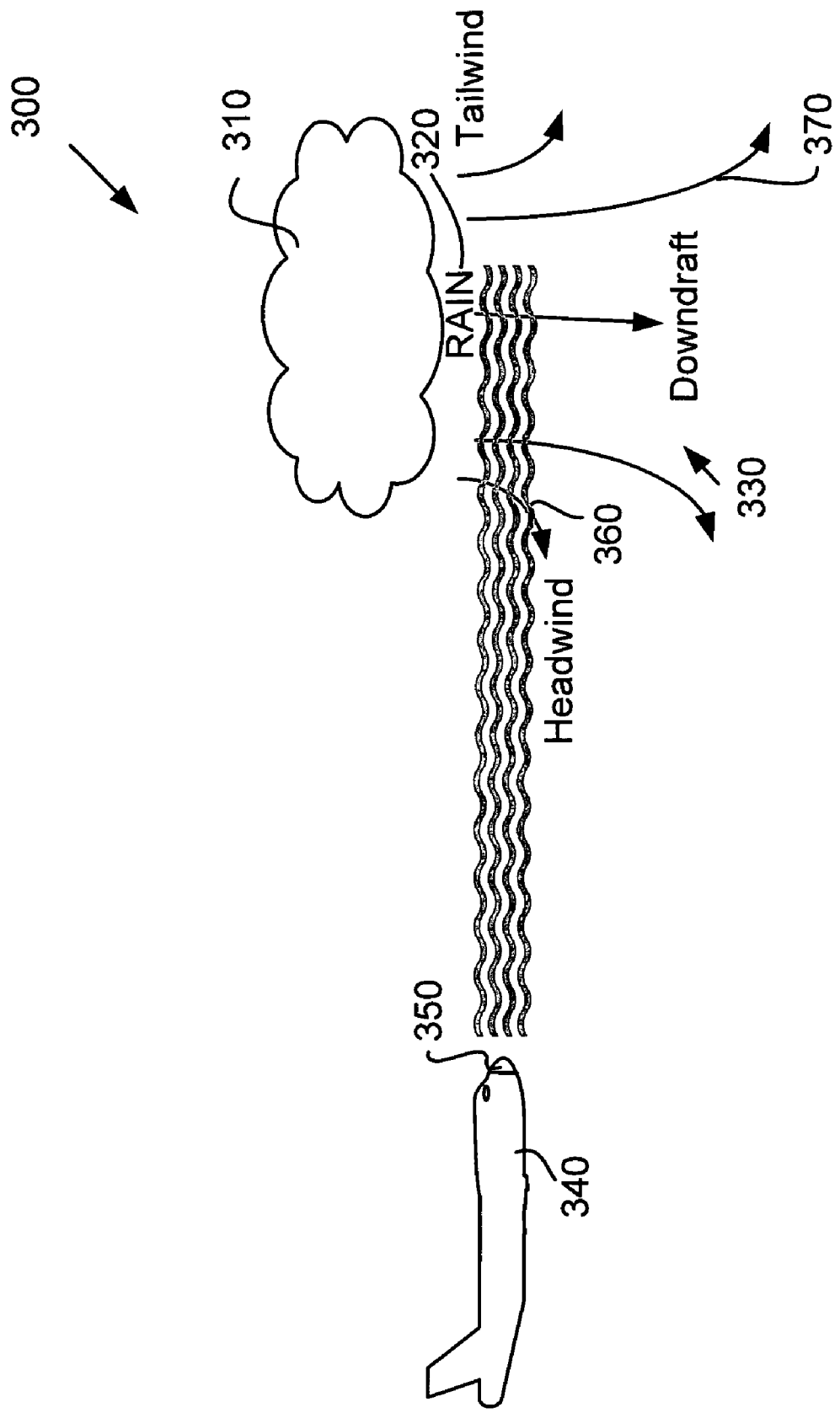
FIG. 3 is an exemplary diagram of radar used to detect windshear events.

Referring now to FIG. 3, a windshear event 300 is depicted. Windshear event 300 stems from storm cell 310 producing rain 320 and microbursts 330. Approaching aircraft 340 has a radar 350 on board. Microwave radar 350 emits microwaves that are reflected back by raindrops 320. The returning signal's frequency is measured and compared with the emitted frequency to determine the direction and speed of the raindrops. A Doppler reading of varying wavelengths can indicate a windshear condition. For example the raindrops born by headwinds 360 return a shorter wavelength. The raindrops born by tailwinds 370 return a longer wavelength.

Other types of sensors for detecting microbursts may be used such as Doppler LIDAR. A laser system called Doppler LIDAR (light detecting and ranging) reflects energy from "aerosols" (minute particles) instead of raindrops. This system can avoid picking up ground clutter (moving cars, etc.) and thus has fewer interfering signals. However, it does not work as well in heavy rain. Such systems may be available from Lockheed Corp.'s Missiles and Space Co., Sunnyvale, Calif.; United Technologies Optical Systems Inc., West Palm Beach, Fla.; and Lassen Research, Chico, Calif.

Another type of sensor for detecting microbursts may be used, such as infrared. Infrared sensors use an infrared detector to measure temperature changes ahead of the airplane. The system monitors the thermal signatures of carbon dioxide to look for cool columns of air, which can be a characteristic of microbursts. Such a system may be less costly and not as complex as others, but does not directly measure wind speeds. A system of this type available from Turbulence Prediction Systems in Denver, Colo.

Each of the windshear predictive systems described above have their own characteristics and deficiencies as well as strengths. As such, improvements continue to be made in each of these and other systems. BRS aircraft has the disadvantage that a relatively small diameter radar antenna is accommodated on the aircraft. Such antennas may have broad beams with the low-power, making it difficult to detect windshear at various ranges. Accordingly, it may be desirable, for BRS aircraft to combine equipment used for reactive windshear systems that measure wind velocity at the aircraft location and which are currently available on aircraft with look-ahead wind velocity detectors which are associated with predictive windshear systems utilizing the smaller antennas of the BRS aircraft. It may be desirable to incorporate any or any combination of the embodiments described on any type of aircraft including conventional air transport systems to improve performance of those systems. The wind velocity detector of the reactive system may detect the front edge of the windshear events while the radar system may be trained further ahead to detect the backside of the windshear event. By doing such, one can extrapolate the wind velocity gradient over the detection area and determine whether a windshear alert should be issued to the pilots.

Figure 4:
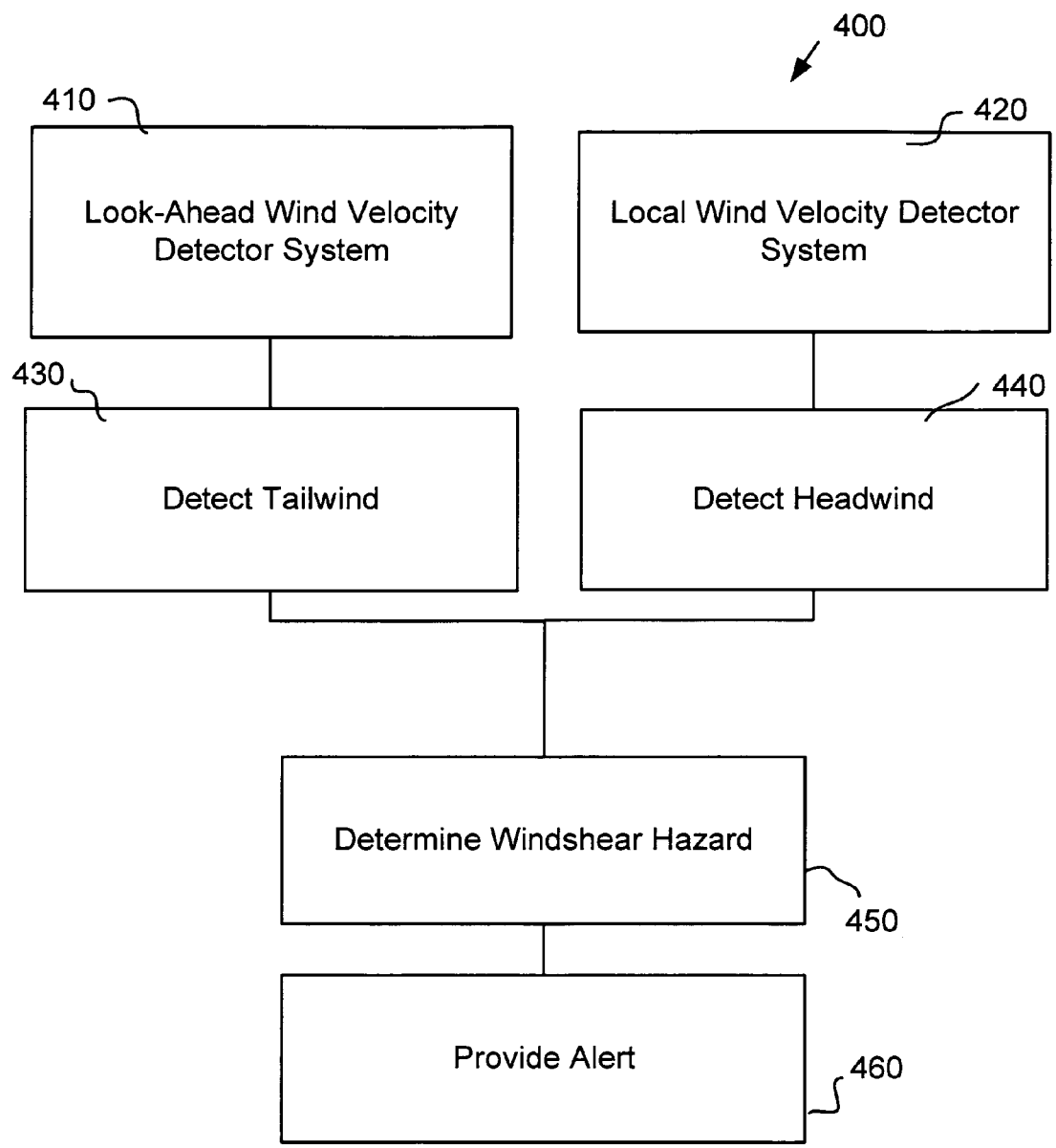
FIG. 4 is a flow diagram of a system and method for detecting windshear events.

For example, referring now to FIG. 4, a hybrid system and method 400 for detecting windshear is depicted. Such a system is a hybrid system using data from equipment associated with both the predictive and reactive windshear systems combining a look-ahead wind velocity detector 410 and a local wind velocity detector system 420. Look-ahead wind velocity detector 410 is enabled to detect the tailwinds which may be present at the trailing edge of the windshear event (process 430). This is accomplished by using the onboard radar of the BRS aircraft. Similarly, other onboard systems may also be used such as the LIDAR or infrared systems described above. The headwind is detected at the beginning of the windshear by the local wind velocity detector 420 (process 440). Once the headwind and tailwinds have been detected, a windshear gradient may be determined in order to determine the windshear hazard (process 450). Once the windshear hazard (process 450) has been determined, an alert may be provided to the flight crew (process 460).

Figure 5:
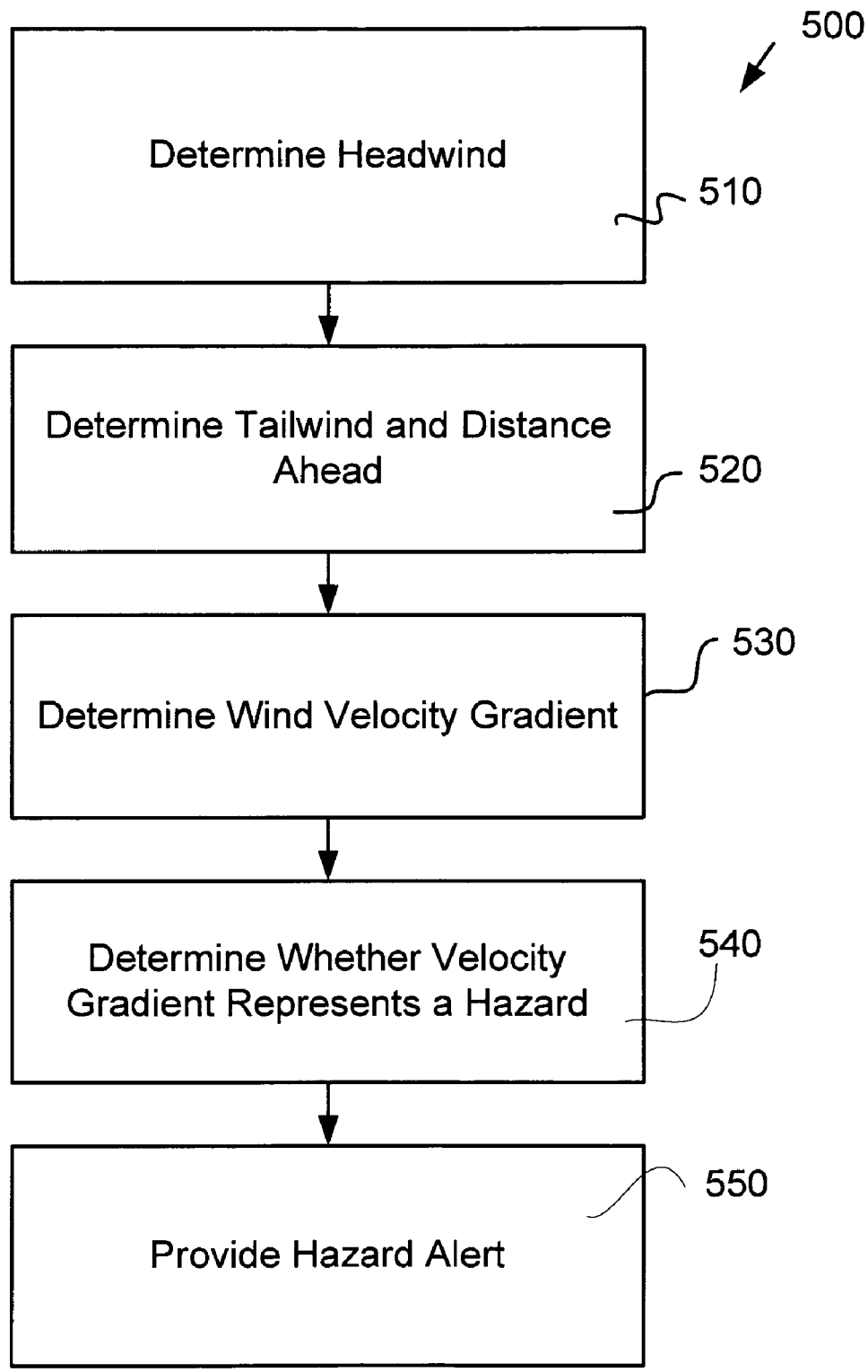
FIG. 5 is an exemplary flow diagram of a method of detecting windshear events using a hybrid predictive and reactive system in accordance with another exemplary embodiment.

Referring now to FIG. 5, a method 500 of providing a windshear hazard alert to a flight crew is depicted. Process 500 includes first determining a headwind at the aircraft location (process 510). Next a tailwind is determined a distance ahead of the aircraft by the look-ahead wind velocity detector (process 520). The tailwind distance ahead of the aircraft is determined by the use of a look-ahead wind velocity detector such as an onboard radar, LIDAR, or infrared system or the like. The headwind is determined by a local wind velocity detector or a system which is on board the aircraft and is capable of measuring the wind velocity being encountered by the aircraft. Once the headwind and tailwind have been determined a velocity gradient is calculated (process 530). Once the velocity gradient is determined, a weather velocity gradient hazard is determined (process 540). Once a hazard has been determined, a hazard alert is then provided to the flight crew (process 550).

Figure 6:
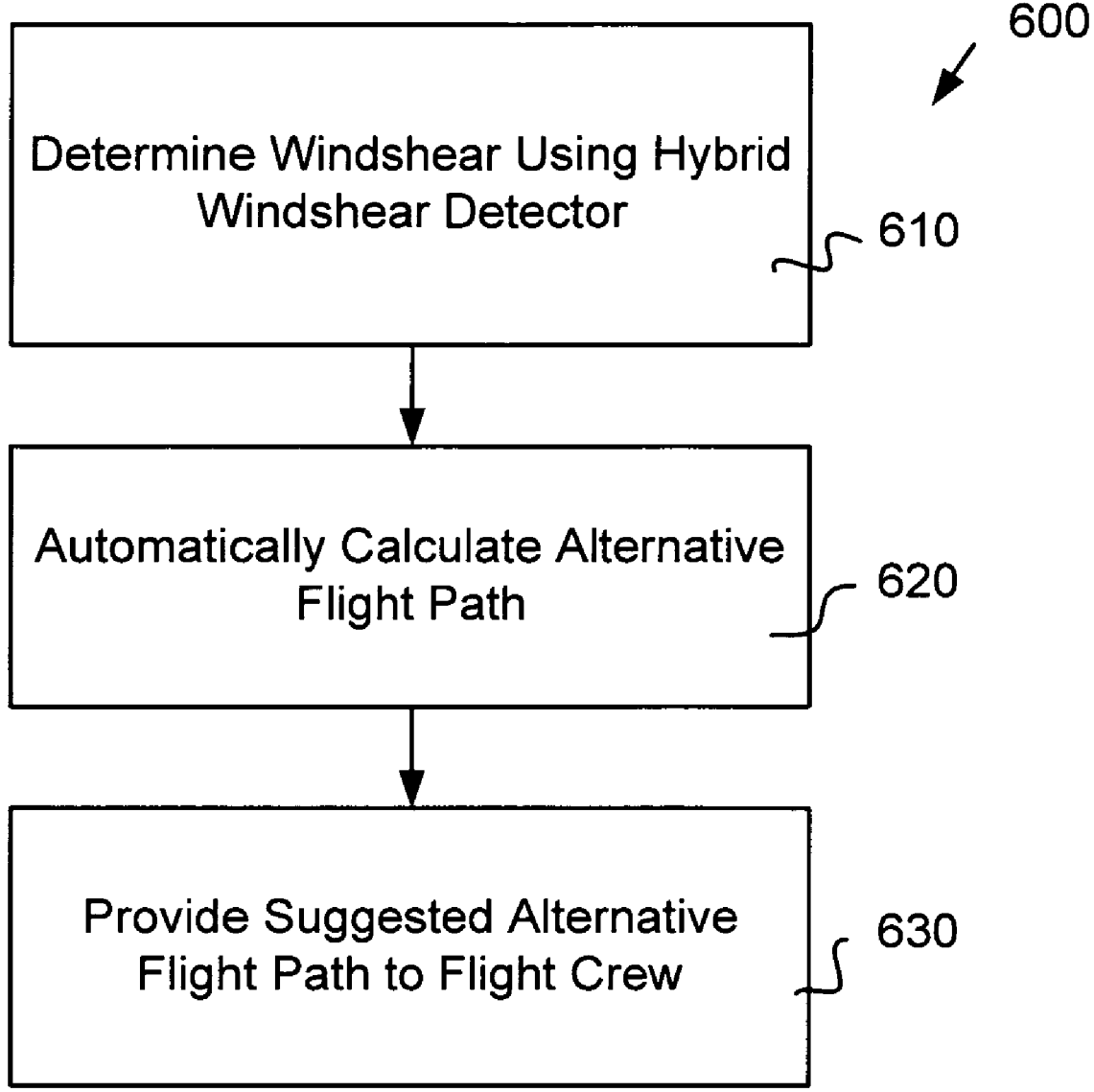
FIG. 6 is an exemplary flow diagram of a method of providing altered flight path suggestions to a flight crew.

Referring now to FIG. 6, a process 600 for providing a new flight path to a flight crew in the presence of a windshear hazard is depicted. Method 600 comprises determining the windshear using a hybrid windshear detector as explained above (process 610). Such a system may be used on a BRS aircraft or other aircraft which may have relatively small microwave radar antennas or may alternatively have limited capabilities of detecting a variety of windshear conditions. Once the windshear is determined using the hybrid windshear detection system, a processing system on board the aircraft automatically calculates an alternative flight path (process 620). Once the alternative flight path has been calculated by the flight computer, the suggested alternative flight path is then provided to the flight crew on a display inside the flight cabin (process 630). Once a suggested flight path has been provided to the crew then may decide to accept the alternative flight path in order to avoid the dangerous windshear condition which has been detected using the hybrid windshear detection system.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of detecting a windshear hazard on an aircraft, the method comprising:
   determining a first wind velocity at a location proximate the aircraft using a wind velocity detector;
   determining a second wind velocity at a distance ahead of the aircraft using a forward-looking wind velocity detection system comprising an airborne weather radar system on board the aircraft;
   determining the wind velocity gradient over the distance; and
   determining whether a windshear hazard exists for the aircraft.

2. The method of claim 1, further comprising:
   alerting the flight crew as to the windshear hazard.

3. The method of claim 1, wherein the first wind velocity is determined by an onboard wind velocity detection system.

4. The method of claim 1, wherein the forward-looking wind velocity detection system comprises a microwave radar.

5. The method of claim 1, wherein the forward-looking wind velocity detection system comprises an onboard Doppler weather radar.

6. The method of claim 1, wherein the forward-looking wind velocity detection system comprises a LIDAR.

7. The method of claim 1, wherein the forward-looking wind velocity system comprises an infrared sensor system.

8. The method of claim 1, wherein the aircraft is a business and regional systems (BRS) aircraft.

9. The method of claim 1, further comprising:
   providing an aural windshear hazard alert.

10. The method of claim 1, further comprising:
    providing a visual windshear hazard alert.

11. The method of claim 1, wherein the method may be implemented to improve the performance of existing systems.

12. A system for determining a presence of a windshear hazard using a local wind velocity detector, and a look-ahead wind velocity detector including a weather radar antenna, the system comprising:
    a processor configured with software to process information from the local wind velocity detector and the look-ahead wind velocity detector and determine whether a windshear hazard exists.

13. The system of claim 12, further comprising:
    an alerting system configured to alert the flight crew as to the windshear hazard.

14. The system of claim 12, wherein the processor receives information from an onboard airspeed sensor system.

15. The system of claim 12, wherein the look-ahead velocity detector comprises a microwave radar.

16. The system of claim 12, wherein the look-ahead velocity detector comprises an onboard weather radar.

17. The system of claim 12, wherein the look-ahead velocity detector comprises a LIDAR.

18. The system of claim 12, wherein the look-ahead velocity detector comprises an infrared sensor system.

19. The system of claim 12, wherein the system is provided on a business and regional systems (BRS) aircraft.

20. The system of claim 12, wherein the local wind velocity detector system detects a headwind and the look-ahead wind velocity detector system detects a tailwind.

21. The system of claim 12, wherein the system may be implemented to improve the performance of existing systems.

22. A method for altering the flight path of an aircraft, comprising:
    determining the presence of windshear in near proximity to the aircraft by using a hybrid windshear detection system, the hybrid windshear detection system comprising a local wind velocity detector and a weather radar system for determining wind velocity at a distance from the aircraft;
    determining automatically an alternative flight path for the aircraft;
    providing a suggestion of the alternative flight path for the aircraft to the flight crew.

* * * * *